United States Patent [19]
Suzuki

[11] Patent Number: 5,889,927
[45] Date of Patent: Mar. 30, 1999

[54] IMAGE PROCESSING METHOD AND APPARATUS

[75] Inventor: Kazuyoshi Suzuki, Kawasaki, Japan

[73] Assignee: Canon Kabushiki Kaisha, Tokyo, Japan

[21] Appl. No.: 803,424

[22] Filed: Feb. 20, 1997

[30] Foreign Application Priority Data

Feb. 23, 1996 [JP] Japan .................................. 8-036332

[51] Int. Cl.$^6$ ...................................................... B41J 15/00
[52] U.S. Cl. ............................ 395/102; 382/299; 345/127
[58] Field of Search .................................... 395/102, 109, 395/114; 382/232, 233, 298, 299, 300; 345/202, 472, 439, 127, 129, 130, 136; 358/448, 451, 528, 428; 707/516

[56] References Cited

U.S. PATENT DOCUMENTS 5,153,936  10/1992  Morris et al. ........................... 395/128
5,751,857  5/1998  Kobayashi ............................... 382/232

*Primary Examiner*—Arthur G. Evans
*Assistant Examiner*—Sterling W. Chandler
*Attorney, Agent, or Firm*—Fitzpatrick, Cella, Harper & Scinto

[57] ABSTRACT

An image processing method and apparatus which can obtain an image, at a desired resolution, far from degradation in image at a high speed is disclosed. Input original image data is converted into hierarchical codes by a JBIG-CODEC 95, and the codes of the layers are stored in a memory. To obtain image information at a desired resolution, a code necessary for representing an image having, of the resolutions which can be represented by the hierarchical codes stored in the memory, a resolution hither than and closest to the desired resolution is selected to execute decoding processing in the JBIG-CODEC 95, thereby obtaining reproduced image data. A resolution conversion unit 96 converts the resolution of the reproduced image into a desired resolution by using, e.g., linear interpolation and outputs the converted image data.

17 Claims, 10 Drawing Sheets

IMAGE PROCESSING METHOD AND APPARATUS

BACKGROUND OF THE INVENTION

This invention relates to an image processing method and apparatus and, more particularly, to an image processing method and apparatus for performing resolution conversion by using, e.g., hierarchical codes.

Conventionally, various methods of converting the resolution of image information have been proposed. However, all of these methods are used to convert the resolution of an original image.

With these methods, therefore, resolution conversion processing must be performed for the original image data itself regardless of the target resolution, and a long time is required in any case.

SUMMARY OF THE INVENTION

Accordingly, it is an object of the present invention to provide an image processing method which can process image information at a high speed regardless of the target resolution.

Accordingly to one aspect of the present invention, the foregoing object is attained by providing an image processing method of converting image information represented by hierarchical codes into image data at a desired resolution, comprising the steps of: decoding the image information represented by the hierarchical codes to reproduce image data; converting a resolution of the image data which has been decoded and reproduced in the decoding step into the desired resolution; and controlling the decoding step and the converting step such that a hierarchical code necessary for reproducing an image having, of resolutions which can be represented by the hierarchical codes, a resolution higher than and closest to the desired resolution is decoded in the decoding step, and the resolution of the image data which has been decoded and reproduced in the decoding step is converted into the desired resolution in the converting step.

It is another object of the present invention to provide an image processing apparatus which can process image information at a high speed regardless of the target resolution.

According to another aspect of the present invention, the foregoing object is attained by providing an image processing apparatus comprising: decoding means for decoding image information represented by hierarchical codes; resolution conversion means for converting a resolution of the decoded information which is decoded by the decoding means into a desired resolution; and control means for controlling the decoding means and the resolution conversion means such that the decoding means decodes a hierarchical code necessary for reproducing an image having, of resolutions which can be represented by the hierarchical codes, a resolution higher than and closest to the desired resolution, and the resolution conversion means converts the resolution of the image into the desired resolution by using the decoded information which has been decoded by the decoding means.

In accordance with the present invention as described above, when image information represented by hierarchical codes is to be decoded to reproduce or reconstruct image data, and the resolution of the decoded and reproduced image data is converted into a desired resolution, control is performed such that a hierarchical code necessary for reproducing an image having, of resolutions which can be represented by the hierarchical codes, a resolution higher than and closest to the desired resolution is decoded.

The apparatus having the above arrangement may have memory means such as a memory or hard disk for storing the hierarchical code to be decoded by the decoding means. The decoding means may decode the hierarchical code by a hierarchical coding method such as progressive build-up according to the JBIG (Joint Bi-level Image Group) scheme.

In addition, input means for inputting image data, e.g., a scanner for reading an image original, coding means for performing hierarchical coding for the image data, and memory means for storing code information of each layer obtained by hierarchical coding may be arranged. Control may be performed such that code information of a layer necessary for representing an image having, of resolutions which can be represented by the stored hierarchical code information, a resolution higher than and closest to the desired resolution is selected, and the code information is decoded.

At this time, the desired resolution is defined by the resolution of the intended output destination device of image information obtained by the resolution conversion means, e.g., a printer, a CRT, or a facsimile connected through a communication line.

It is preferable that designation means for designating the output destination device or designating to read the image original be arranged.

The invention is particularly advantageous since image data representing an image is held as hierarchical codes, when the resolution of the image is to be converted to a certain resolution, a hierarchical code necessary for reproducing an image having, of resolutions which can be represented by the hierarchical codes, a resolution higher than and closest to the desired resolution is decoded, and the resolution of the decoded and reproduced image data is converted into the desired resolution. With this arrangement, the speed of resolution conversion processing can be increased as compared to processing of converting the resolution of the original image itself.

In addition, since compression/expansion is performed by coding/decoding processing according to the JBIG scheme free from degradation in image quality, an image far from degradation can be obtained at a high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
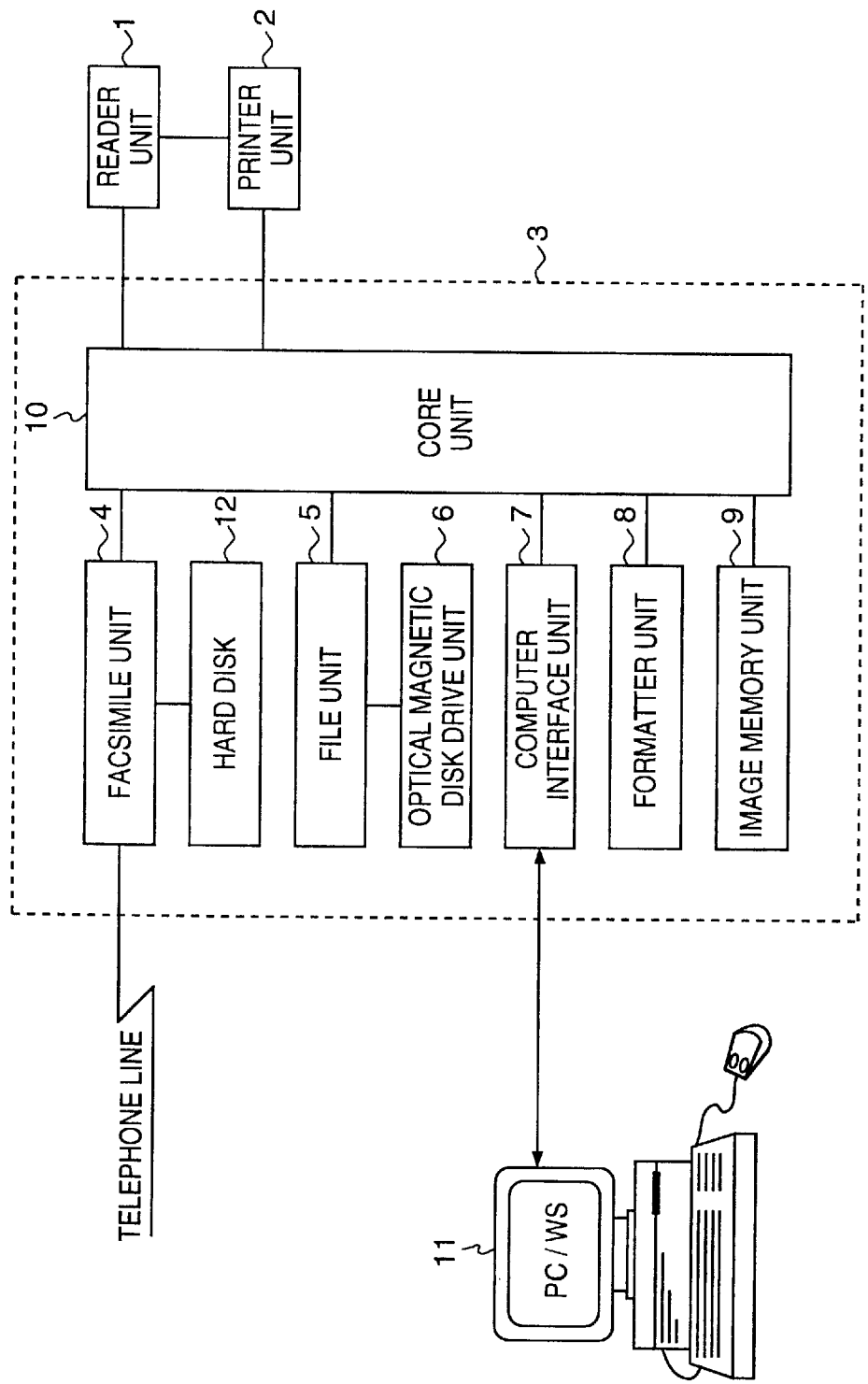
FIG. 1 is a block diagram showing the arrangement of an image processing apparatus according to a representative embodiment of the present invention.

FIG. 1 is a block diagram showing the arrangement of an image processing apparatus according to a representative embodiment of the present invention. As shown in FIG. 1, a reader unit 1 reads an original image and outputs image data corresponding to the original image to a printer unit 2 and an image input/output control unit 3. The printer unit 2 prints an image represented by image data output from the reader unit 1 and the image input/output control unit 3 on a printing medium such as a print paper.

The image input/output control unit 3 connected to the reader unit 1 comprises a facsimile unit 4, a file unit 5, an optical magnetic disk drive unit 6, a computer interface unit 7, a formatter unit 8, an image memory unit 9, a core unit 10, a hard disk (HD) 12, and the like.

The facsimile unit 4 expands compressed image data received via a telephone line and transfers the expanded image data to the core unit 10, or compresses image data transferred from the core unit 10 and transmits the compressed image data via the telephone line. The hard disk (HD) 12 is connected to the facsimile unit 4 so that the received compressed image data can be temporarily stored.

The optical magnetic disk drive unit 6 is connected to the file unit 5. The file unit 5 compresses image data transferred from the core unit 10 and stores the image data, together with keywords for retrieving the image data, in an optical magnetic disk set in the optical magnetic disk drive unit 6. The file unit 5 also retrieves desired compressed image data stored in the optical magnetic disk on the basis of the keyword transferred via the core unit 10, reads and expands the retrieved compressed image data, and transfers the expanded image data to the core unit 10.

The computer interface unit 7 controls the interface between the core unit 10 and a PC/WS 11 constituted by a personal computer or a workstation. The computer interface unit 7 supports LAN interfaces as well as basic interfaces including serial and parallel interfaces. As its network function, the computer interface unit 7 supports not only protocols for lower layers such as an SLIP (Serial Line IP) for supporting a TCP/IP on a serial line or a TCP/IP on a LAN, or EtherTalk but also services for upper layers such as Netware and NFS (Network File System).

The formatter unit 8 develops code data representing an image transferred from the PC/WS 11 to bitmap image data so that the printer unit 2 can print out. The image memory unit 9 temporarily stores the data transferred from the PC/WS 11. The image memory unit 9 performs necessary image processing for the transferred data. Though the details will be described later, the core unit 10 controls the data flow among the reader unit 1, the facsimile unit 4, the file unit 5, the computer interface unit 7, the formatter unit 8, and the image memory unit 9.

Figure 2:
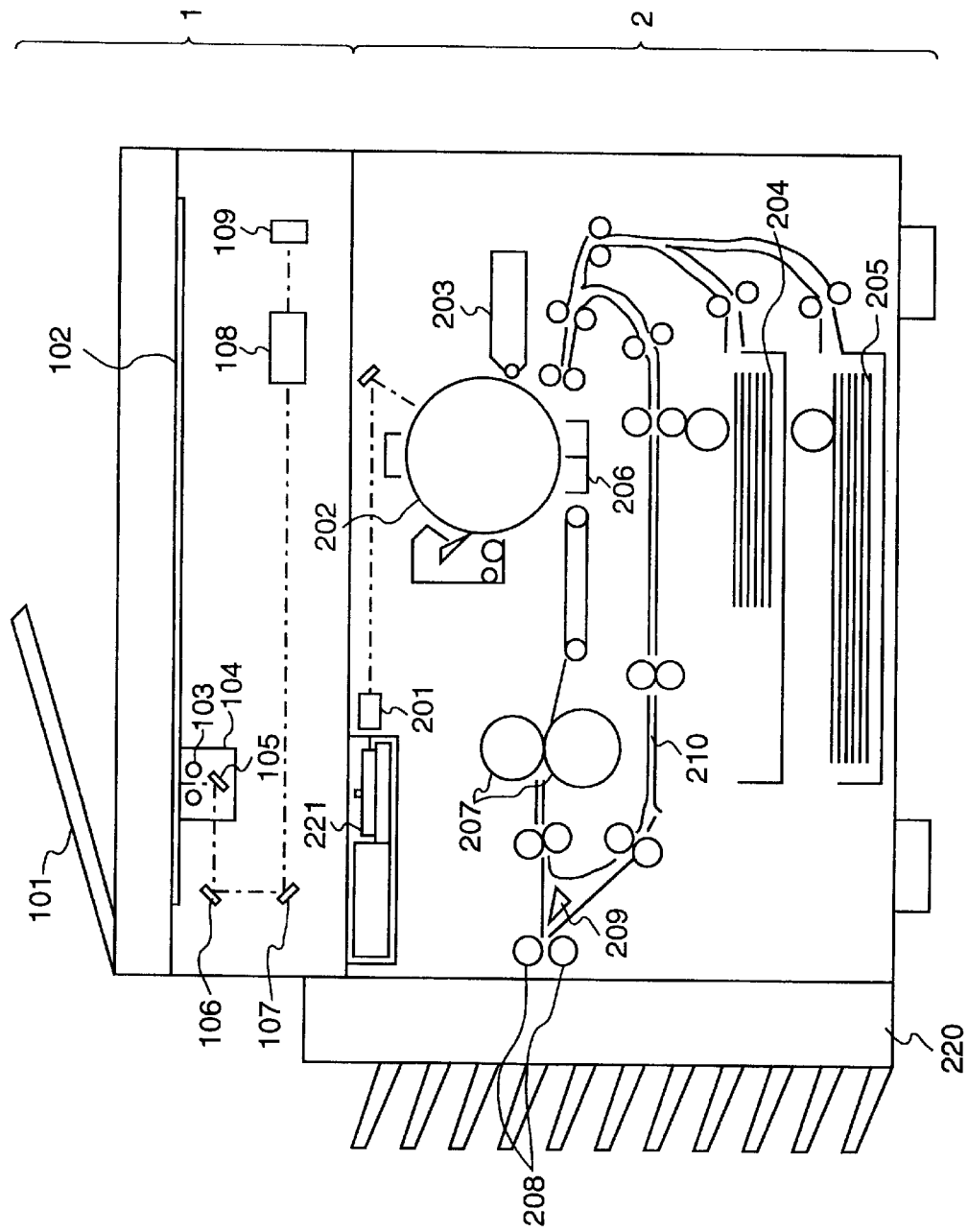
FIG. 2 is a sectional side-view showing the arrangement of a reader unit 1 and a printer unit 2.

FIG. 2 is a sectional side-view showing the arrangement of the reader unit 1 and the printer unit 2.

Referring to FIG. 2, an automatic document feeder 101 of the reader unit 1 feeds originals one by one from the last page onto a platen glass 102 and discharges the original on the platen glass 102 upon completion of the original read operation. When an original is fed onto the platen glass 102, a lamp 103 is turned on, and a scanner unit 104 moves to expose and scan the original. Light reflected by the original is guided into a CCD image sensor (to be referred to as a "CCD" hereinafter) 109 by mirrors 105 to 107 and a lens 108. In this way, the scanned original image is read by the CCD 109. Image data output from the CCD 109 is subjected to predetermined processing and then transferred to the printer unit 2 and the core unit 10 of the image input/output control unit 3.

A laser driver 221 of the printer unit 2 drives a semiconductor laser 201 and causes the semiconductor laser 201 to emit a laser beam corresponding to the image data output from the reader unit 1. This laser beam is irradiated on a photosensitive drum 202, and a latent image corresponding to the laser beam is formed on the photosensitive drum 202. A printing material such as toner is applied to the latent image portion of the photosensitive drum 202 by a developing device 203.

In synchronism with the start of laser beam irradiation, a print paper is fed from a cassette 204 or 205 and conveyed to a transfer unit 206. The printing material applied to the photosensitive drum 202 is transferred to the print paper. The print paper applied with the printing material is transferred to a fixing unit 207, and the printing material is fixed on the print paper by heat and pressure of the fixing unit 207.

The print paper passing through the fixing unit 207 is discharged from the apparatus by discharge rollers 208. A sorter 220 stores the discharged print papers in bins, thereby sorting the print papers. If the apparatus has not been instructed to sort the print papers by the sorter 220, the print papers are accumulated in the uppermost bin. In a both-side printing mode, after the print paper is conveyed to the discharge rollers 208, the rotation direction of the discharge rollers 208 is reversed to guide the print paper to a re-feed conveyance path 210 by a flapper 209. If the apparatus has received an instruction for multiple printing, the print paper is guided to the re-feed conveyance path by the flapper 209 before the print paper reaches the discharge rollers 208. The print paper guided to the re-feed conveyance path is again fed to the transfer unit 206 at the above-described timing.

Note that the reader unit 1 and the printer unit 2 can respectively input and output an image at a resolution of 400 dpi.

Figure 3:
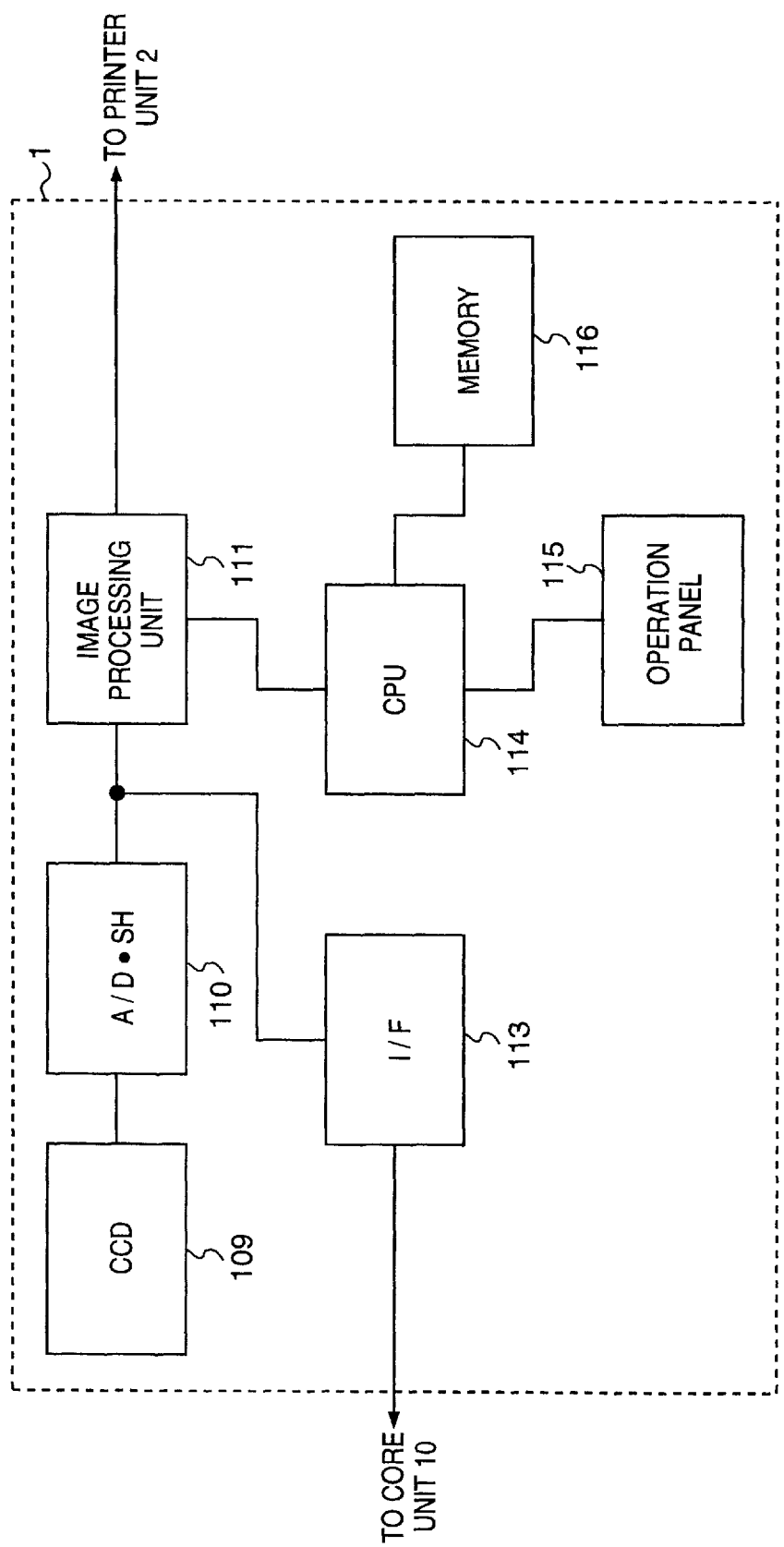
FIG. 3 is a block diagram showing the detailed arrangement of a data processing unit for performing image data processing in the reader unit 1.

FIG. 3 is a block diagram showing the detailed arrangement of a data processing unit for performing image data processing in the reader unit 1.

Referring to FIG. 3, analog image data output from the CCD 109 is analog/digital-converted by an A/D• SH unit (shading unit) 110. With this processing, the analog image data is converted into a corresponding digital signal, and at the same time, shading correction is performed. The image data processed by the A/D• SH unit 110 is transferred to the printer unit 2 through an image processing unit 111 and also transferred to the core unit 10 of the image input/output control unit 3 through an interface unit (I/F) 113.

A CPU 114 controls the image processing unit 111 and the interface unit (I/F) 113 in accordance with the contents of an instruction from an operation panel 115. When a copy mode for performing trimming processing and copy processing is selected by the operation panel 115, control is performed such that trimming processing is performed by the image processing unit 111, and the trimmed image data is transferred to the printer unit 2. When a facsimile transmission mode is selected by the operation panel 115, control is performed such that the image data and a control command corresponding to the selected mode are transferred from the interface unit (I/F) 113 to the core unit 10.

The control program for the control executed by the CPU 114 is stored in a memory 116. The CPU 114 reads out the control program from the memory 116 and executes the control program, thereby performing the above control. The memory 116 is also used as a working area for the CPU 114.

Figure 4:
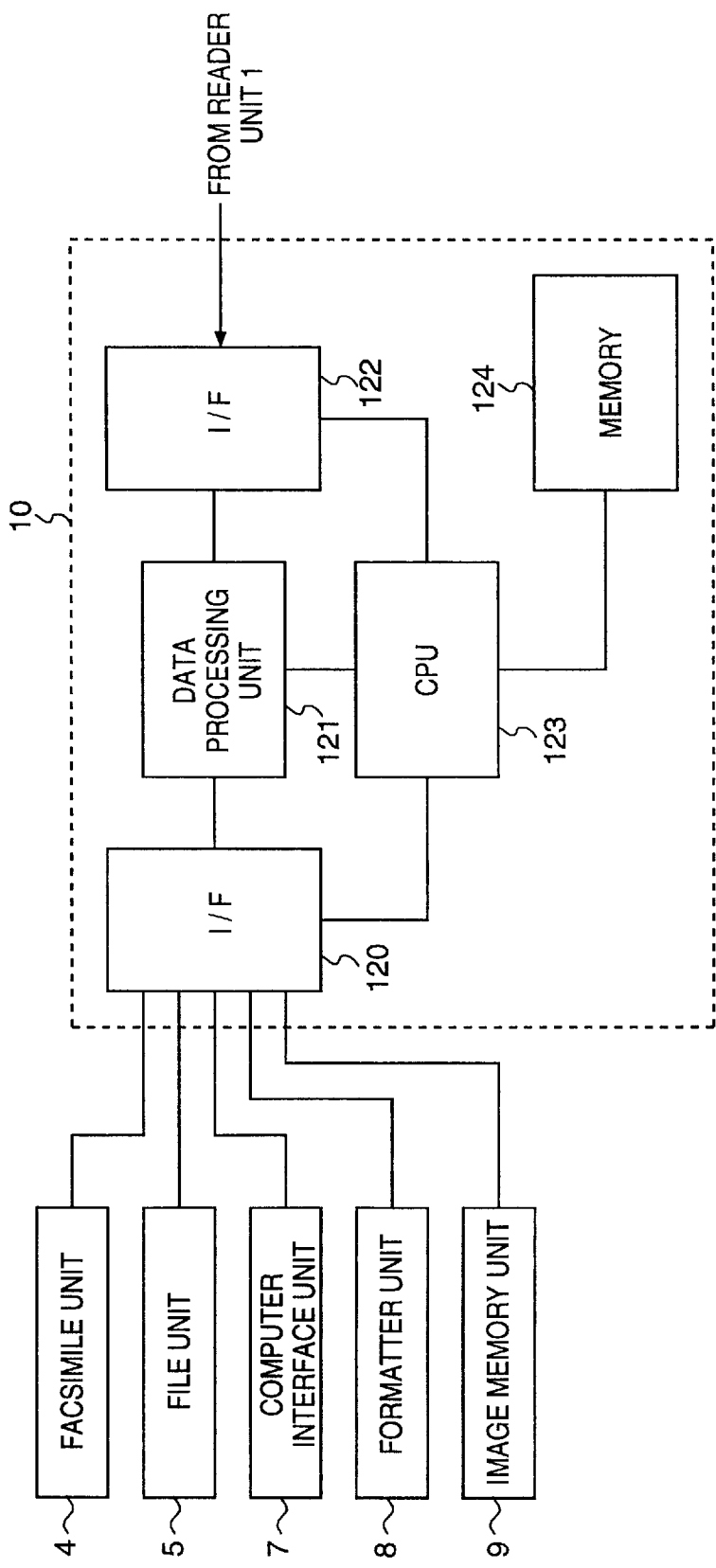
FIG. 4 is a block diagram showing the detailed arrangement of a core unit 10.

FIG. 4 is a block diagram showing the detailed arrangement of the core unit 10.

Image data from the reader unit 1 is transferred to a data processing unit 121 through an interface unit (I/F) 122, and a control command from the reader unit 1 is transferred to a CPU 123. The data processing unit 121 performs image processing such as rotation or magnification/reduction processing of the image. The image data which is transferred from the reader unit 1 to the data processing unit 121 is subjected to image processing according to the control command transferred from the reader unit 1. The image data is transferred to the facsimile unit 4, the file unit 5, the computer interface unit 7, or the image memory unit 9 through an interface unit (I/F) 120.

Code data representing an image which is input through the computer interface unit 7 is transferred to the data processing unit 121, and then, to the formatter unit 8, and developed into bitmap image data. Thereafter, the bitmap image data is transferred to the data processing unit 121, and then, to the facsimile unit 4 or the printer unit 2.

Image data from the facsimile unit 4 is transferred to the data processing unit 121, and then, to the printer unit 2, the file unit 5, or the computer interface unit 7. Image data from the file unit 5 is transferred to the data processing unit 121, and then, to the printer unit 2, the facsimile unit 4, or the computer interface unit 7.

The CPU 123 performs various control operations in accordance with the control program stored in a memory 124 and a control command transferred from the reader unit 1. The memory 124 is also used as a working area for the CPU 123.

In this embodiment, combined processing of original image read, image print, image transmission/reception, image storage, data input/output into/from the computer, and the like can be performed using the core unit 10.

Figure 5:
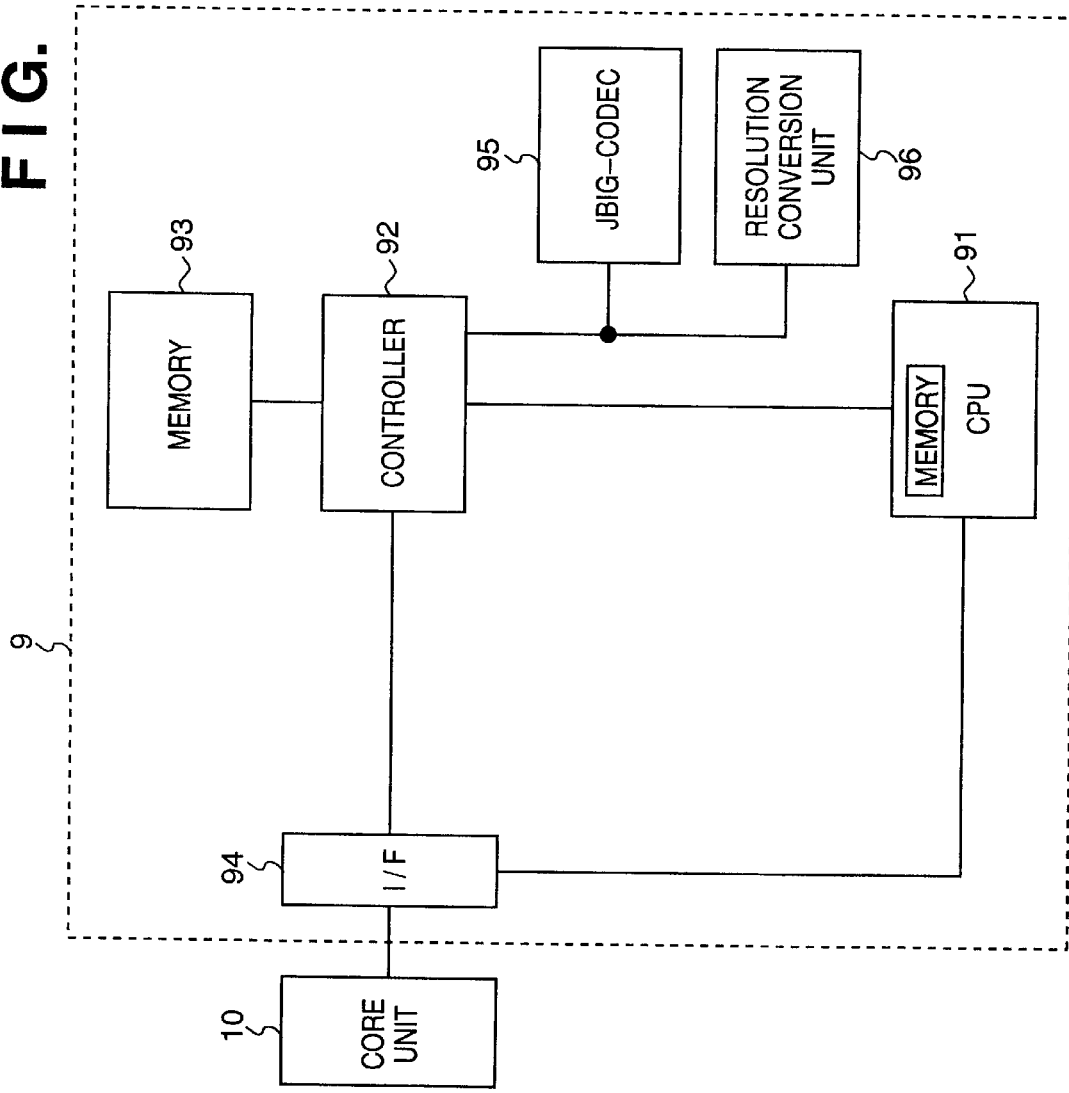
FIG. 5 is a block diagram showing the detailed arrangement of an image memory unit 9 shown in FIG. 1.

FIG. 5 is a block diagram showing the detailed arrangement of the image memory unit 9 shown in FIG. 1.

As shown in FIG. 5, the image memory unit 9 comprises a CPU 91 for controlling the entire operation of the image memory unit 9 in accordance with the control program stored in the integrated memory, a controller 92 which operates under the control of the CPU 91 to control some constituent elements, a memory 93 for storing image data, an interface unit (I/F) 94 for controlling interface with the interface unit 122 of the core unit 10, a JBIG-CODEC 95 for hierarchically compressing/expanding input image data in accordance with the JBIG scheme, and a resolution conversion unit 96 for converting the resolution of input image data.

Figure 6:
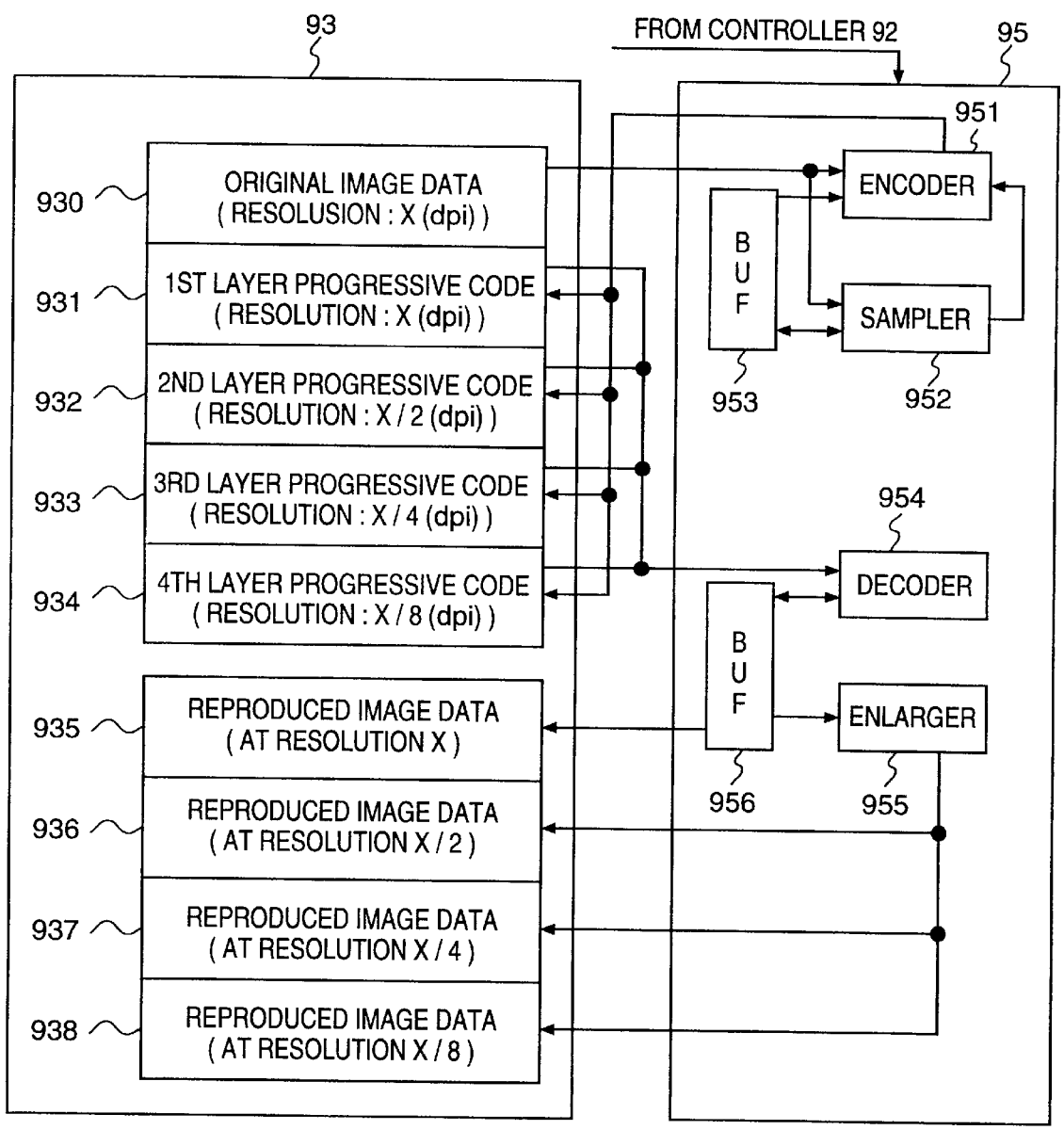
FIG. 6 is a block diagram showing the arrangement of a JBIG-CODEC 95, and original image data, hierarchical encoded data, and decoded data, which are stored in a memory 93.

FIG. 6 is a block diagram showing the arrangement of the JBIG-CODEC 95, and original image data, hierarchical coded data, and decoded data, which are stored in the memory 93. In FIG. 6, the resolution of the original image data is "x (dpi)", and the number of layers is "4".

Under the control of the controller 92, a sampler 952 reads out original image data 930 at resolution "x (dpi)" from the memory 93, generates image data whose resolution is reduced to "x/2" along the vertical and horizontal directions, and outputs the reduced image data to an encoder 951 and a buffer 953. The encoder 951 generates 1st-layer progressive code data by using the original image data 930 and the reduced image data. This code data is output to an area 931 of the memory 93.

Next, the sampler 952 reads out the image data at resolution "x/2" from the buffer 953, generates image data whose resolution is reduced to "x/4" along the vertical and horizontal directions, and outputs the reduced image data to the encoder 951 and the buffer 953. The encoder 951 generates 2nd-layer progressive code data by using the image data at resolution "x/2" and the image data at resolution "x/4". This code data is output to an area 932 of the memory 93.

In a similar manner, 3rd- and 4th-layer progressive code data are output to areas 933 and 934 of the memory 93, respectively.

The buffer 953 can simultaneously store image data corresponding to the resolutions of two layers.

The coded data which has undergone the hierarchical coding is decoded in the following manner.

A decoder 954 reads out the lowest-layer (4th-layer) progressive code data from the memory, decodes the code data, and outputs the decoded data to a buffer 956. An enlarger 955 reads out the decoded data from the buffer 956, enlarges the decoded data to the size of the original image, and outputs the enlarged image data to an area 938 of the memory 93. With this processing, reproduced image data at resolution "x/8" is stored in the area 938.

Subsequently, the decoder 954 reads out the 3rd-layer progressive code data from the memory 93, and the data decoded using the 4th-layer progressive code data from the buffer 956, decodes the code data using these data, and outputs the decoded data to the buffer 956. The enlarger 955 reads out the decoded data from the buffer 956, enlarges the data to the size of the original image, and outputs the enlarged image data to an area 937 of the memory 93. With this processing, reproduced data at resolution "x/4" is stored in the area 937.

In a similar fashion, reproduced image data at resolution "x/2" and reproduced image data at resolution "x" are stored in areas 936 and 935 of the memory 93, respectively.

If the CPU 91 or controller 92 has high data processing capability, hierarchical coding/decoding processing according to the JBIG scheme can be realized by causing the CPU 91 or controller 92 to execute a dedicated processing program instead of using any dedicated circuit such as the JBIG-CODEC 95.

Figure 7:
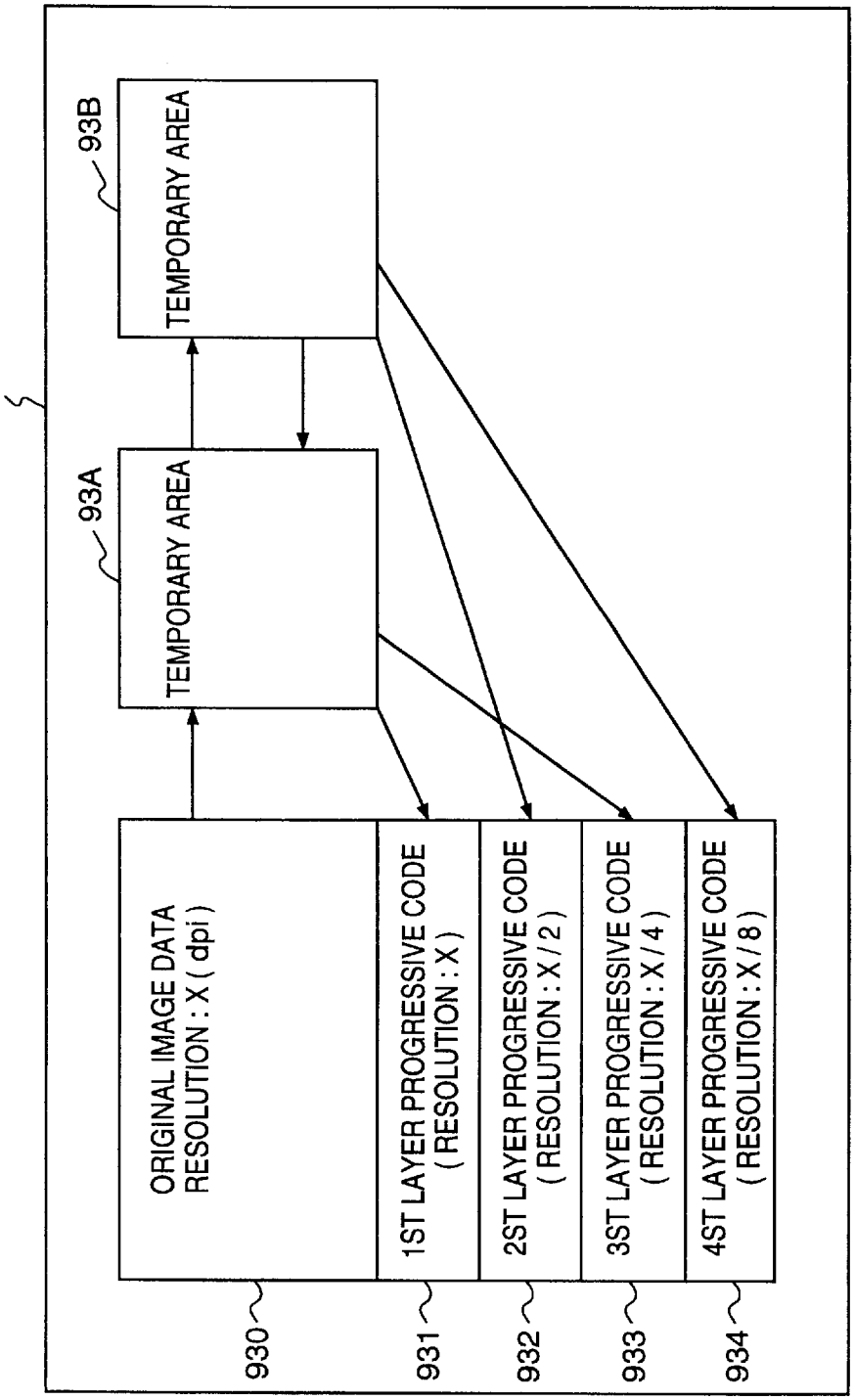
FIG. 7 is a view showing a temporary area set in the memory 93 in coding processing and the relationship between the original image data and the hierarchical coded data.

In this case, coding processing is performed while setting a temporary area as shown in FIG. 7 in the memory 93.

More specifically, the CPU 91 or controller 92 sequentially reads out the original image data 930 at resolution "x" stored in the memory 93, generates reduced image data at resolution "x/2", and stores the reduced image data in a temporary area 93A of the memory 93. The CPU 91 or controller 92 generates the 1st-layer progressive code data by using the original image data 930 and the reduced image data at resolution "x/2", and stores the code data in the area 931 of the memory 93.

The CPU 91 or controller 92 sequentially reads out the reduced image data at resolution "x/2" stored in the temporary area 93A, generates reduced image data at resolution "x/4", and stores the reduced image data in a temporary area 93B of the memory 93. The CPU 91 or the controller 92 generates the 2nd-layer progressive code data by using the reduced image data at resolution "x/2" and the reduced image data at resolution "x/4", and stores the code data in the area 932 of the memory 93.

In a similar way, the 3rd-layer progressive code data is generated and stored in the area 933 of the memory 93. Coding for the lowest layer (4th layer) is executed by sequentially reading out only the reduced image data at resolution "x/8" stored in the temporary area 93A, and the code data is stored in the area 934 of the memory 93.

In the image memory unit 9 having the above arrangement, data transferred from the reader unit 1 or PC/WS 11 through the core unit 10 is input to the interface unit (I/F) 94 and stored in the memory 93 through the controller 92. When the original read resolution of the reader unit 1 is 400 dpi, and a read image (A) is sent from the reader unit 1, original image data at a resolution of 400 dpi is stored in the memory 93.

Next, the data stored in the image input/output control unit 3 is subjected to four-layer coding processing according to the JBIG scheme following the above-described procedures by the JBIG-CODEC 95. The coded data which has undergone the coding processing is stored in the memory 93. More specifically, code data of each layer obtained by four-layer JBIG coding processing is stored in the memory 93.

Figure 8:
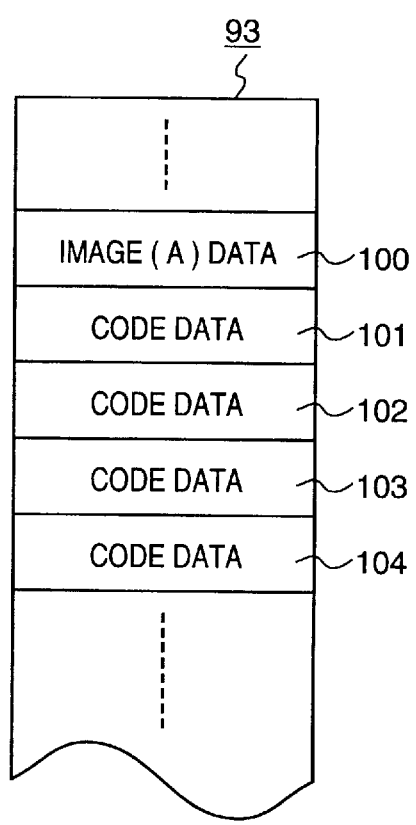
FIG. 8 is a view showing a state in which image data representing an original image (A) and code data corresponding to images at four resolutions based on the image (A) are stored in the memory 93.

FIG. 8 is a view showing a state in which image data representing the original image (A) and code data corresponding to images at four resolutions based on the image (A) are stored in the memory 93. Referring to FIG. 8, reference numeral 100 denotes original image (A) data sent from the core unit 10; 101, highest-layer code data necessary for reproducing an image at a resolution of 400 dpi; 102, highest-layer code data necessary for reproducing an image at a resolution of 200 dpi; 103, highest-layer code data necessary for reproducing an image at a resolution of 100 dpi; and 104, code data necessary for reproducing an image at a resolution of 50 dpi.

When a reduced image at a resolution of, e.g., 160 dpi is to be generated from an original image read by the reader unit 1, code data representing an image at a resolution higher than and closest to the desired resolution, i.e., 160 dpi is selected, by the CPU 91, from the code data stored in the memory 93. In the example of FIG. 8, the code data 102 to 104 are selected.

The JBIG-CODEC 95 performs decoding processing using the selected code data to decode the image data into image data representing an image at a resolution of 200 dpi, and outputs the decoded data to the memory 93. Thereafter, the CPU 91 instructs the resolution conversion unit 96 to perform resolution conversion, i.e., convert the image data at a resolution of 200 dpi into image data at a resolution of 160 dpi. The resolution conversion unit 96 performs resolution conversion, i.e., converts the image data at a resolution of 200 dpi into image data at a resolution of 160 dpi on the basis of the instruction. This resolution conversion processing is executed in the following manner. The resolution conversion unit 96 sequentially reads out the decoded image data from the memory 93, and generates image data at a designated resolution by performing linear interpolation along the vertical and horizontal directions. The generated image data is stored in a predetermined area of the memory 93.

With the above processing, an image at a desired resolution can be obtained in a very short time.

To convert an original image at a resolution of 400 dpi into an image at a higher resolution, the CPU 91 converts the resolution into a desired resolution by using the original image stored in the memory 93, e.g., the original image (A) data transferred from the reader unit 1.

Thereafter, the data which has undergone the image processing as described above is transferred to the core unit 10 through, i.e., the interface unit (I/F) 94. The core unit 10 transfers the data to the printer unit 2, the PC/WS 11, or the like.

Figure 9:
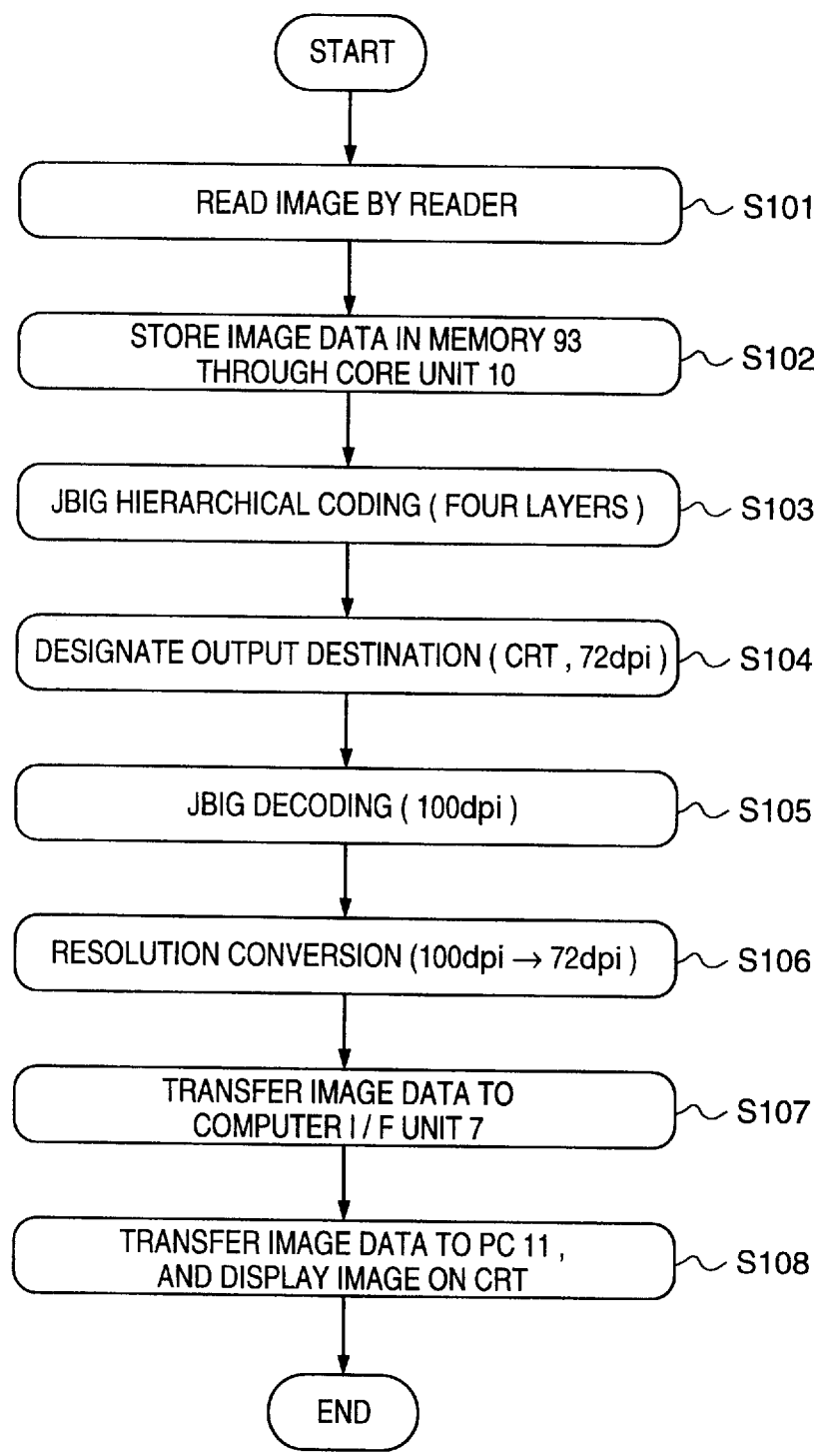
FIG. 9 is a flow chart showing resolution conversion processing for image data by decoding.

Processing of transferring image data based on an image original of one page, which is read by the reader unit 1, to the PC/WS 11 at a resolution instructed by the user will be described next with reference to the flow chart shown in FIG. 9. Assume that the read resolution of the reader unit 1 is 400 dpi, and the display resolution of the CRT display of the PC/WS 11 is 72 dpi.

The user sets an original of one page in the automatic document feeder 101 of the reader unit 1, designates image read processing from the operation panel 115, and depresses the start key (not shown). The original image is read by the reader unit 1 in step S101. In step S102, image data at a resolution of 400 dpi based on the original is transferred to the image memory unit 9 through the core unit 10. The CPU 91 controls the controller 92 to store the transferred image data in a predetermined area of the memory 93.

In step S103, the CPU 91 performs control, through the controller 92, to cause the JBIG-CODEC 95 to perform hierarchical coding of the image data stored in the memory 93 in accordance with the above-described procedures. With this processing, code data of four layers are stored in the areas 931 to 934 of the memory 93 in units of layers.

This hierarchical coding processing may be executed by activating a processing program by the CPU 91 or controller 92, instead of using the JBIG-CODEC 95.

In step S104, the user designates, from the operation panel 115, e.g., the CRT display of the PC/WS 11 connected to the computer interface unit 7 as an image output destination. Other than the CRT display of the PC/WS 11, the printer unit 2 capable of outputting an image at a resolution of 400 dpi, or a printer (not shown) at a resolution of 160 dpi, which is connected to the PC/WS 11, can be selected.

When the CRT display of the PC/WS 11 is selected as the image output destination, the JBIG-CODEC 95 performs decoding processing using only code data (3rd- and 4th-layer progressive code data stored in the areas 933 and 934 of the memory 93, respectively) necessary for representing an image at a resolution of 100 dpi in step S105. The obtained decoded data (image data representing an image at a resolution of 100 dpi) are stored in the areas 937 and 938 of the memory 93, respectively. When an image output destination at another resolution is selected, decoding processing is executed by selecting code data which can represent an image at a resolution higher than and closest to the resolution.

In step S106, the resolution conversion unit 96 performs resolution conversion of 72/100x by using the decoded and reproduced image data stored in the memory 93 under the control of the controller 92 and stores an image data at a resolution of 72 dpi in a predetermined area of the memory 93. Decoding processing and resolution conversion processing in steps S105 and S106 may be executed by activating a processing program by the CPU 91 or controller 92, instead of using the JBIG-CODEC 95 or resolution conversion unit 96.

In step S107, the obtained image data at a resolution of 72 dpi is transferred to the computer interface unit 7 through the core unit 10.

Finally, in step S108, the image data is transferred from the computer interface unit 7 to the PC/WS 11, and the image is displayed on the CRT of the PC/WS 11.

As described above, according to this embodiment, image data representing an image is held as hierarchical codes. When the resolution of the image is to be converted into a certain resolution, only a hierarchical code necessary for reproducing an image having, of resolutions which can be represented by the hierarchical codes, a resolution higher than and closest to the desired resolution is decoded, and the resolution of the decoded image data is converted into the desired resolution. With this arrangement, resolution conversion processing can be performed at a higher speed.

[Another Embodiment]

Figure 10:
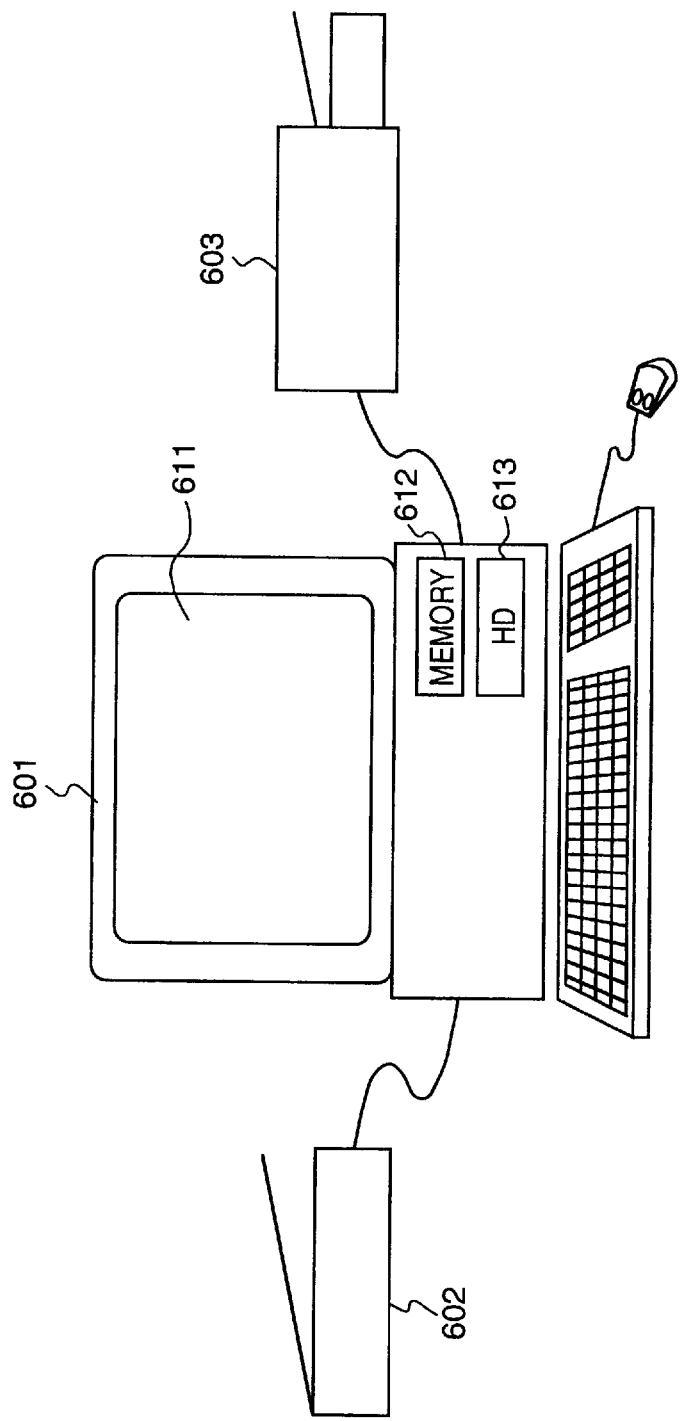
FIG. 10 is a view showing the arrangement of an electronic filing system according to another embodiment.

FIG. 10 is a view showing the arrangement of an electronic filing system (to be referred to as a system hereinafter) according to another embodiment.

Referring to FIG. 10, reference numeral 601 denotes a host computer (PC) for performing various information processing operations; 602, a scanner capable of reading an original image at a resolution of 400 dpi; and 603, a printer capable of outputting an image at a resolution of 180 dpi.

An application program for filing is installed in the program storage area of an internal memory 612 in the PC 601. With this application program, image data can be stored into an internal hard disk unit (HD) 613 in the PC 601, and image data stored in the hard disk unit (HD) 613 can be retrieved/output.

The PC 601 has the same arrangement as the image input/output control unit 3 in the above embodiment. Compression and coding/expanding and decoding of image data according to the JBIG scheme is performed by an image memory unit as in the above embodiment. In the above embodiment, processed data and the like are stored in the memory 93. In this embodiment, however, the hard disk unit (HD) 613 is used as a storage unit, and code data compressed according to the JBIG scheme is stored in the hard disk unit (HD) 613.

Image processing in the system with the above arrangement will be described next.

An operation of registering an image in the system will be described first.

An image to be registered is set in the scanner 602. The application program of the PC 601 is activated to input a registration instruction from the keyboard or mouse of the PC 601. The PC 601 directs the scanner 602 to read the set original and transfer the image data to the PC 601. Upon receiving this instruction, the scanner 602 transmits image data obtained by reading the original image to the PC 601.

Upon receiving the read image data from the scanner 602, the PC 601 stores the image data in the memory 612 (main memory) of the PC 601. The resolution of this stored image is 400dpi, i.e., the read resolution of the scanner 602.

The PC 601 performs four-layer coding for this image data on the basis of the JBIG scheme according to the same procedures as described in the above embodiment. The generated codes are stored in predetermined areas of the hard disk unit (HD) 613. More specifically, code data corresponding to images at resolutions of 400, 200, 100, and 50 dpi are stored, as shown in FIG. 8.

An operation of retrieving/outputting an image registered in the system will be described next.

A case in which an image at a resolution of 180 dpi is output to the printer 603 on the basis of code data stored in the hard disk unit (HD) 613 will be described.

In this case, decoding and resolution conversion processing are performed by the same processing as in the above-described embodiment to obtain a desired resolution. More specifically, the CPU of the PC 601 selects code data necessary for reproducing an image at a resolution of 200 dpi, i.e., higher than and closest to the resolution of the printer as an image output destination. The selected code data is used to perform decoding processing according to the JBIG scheme, thereby reproducing an image at a resolution of 200 dpi. The resolution of the reproduced image data is converted into a resolution of 180 dpi, as in the above embodiment. Thereafter, the image data at a resolution of 180 dpi is transferred to the printer 603, and an image represented by the image data is printed out.

As described above, according to this embodiment, resolution conversion processing to an image at a desired resolution can be performed in a short time, as in the above embodiment.

In this embodiment, the printer is selected as the image output destination. However, the present invention is not limited to this. For example, a CRT 611 of the PC 601 may be selected as the image output destination, and the image may be displayed at a different resolution (e.g., 72 dpi). Alternatively, a facsimile apparatus connected through a telephone line may be designated.

As has been described above, according to the above two embodiments, image data representing an image is held as hierarchical code data. To convert the resolution of the image into a desired resolution, hierarchical code data necessary for reproducing an image having, of resolutions which can be reproduced by the hierarchical code data, a resolution higher than and closest to the desired resolution is decoded, and the resolution of the decoded and reproduced image data is converted into the desired resolution. With this arrangement, the processing speed can be increased as compared to resolution conversion processing from the original image.

Particularly, this arrangement can be effectively applied to resolution conversion processing for obtaining a very low resolution because an amount of coded data necessary for decoding processing is small.

Since the PRES (Progressive Reduction Scheme) as a resolution conversion scheme employed by the JBIG scheme is an excellent technique far from image degradation, image degradation by the above method is minimum. That is, when JBIG compression/expansion is used, an image far from degradation can be obtained at a high speed.

In the above embodiments, the number of layers of hierarchical coding is "4". However, the present invention is not limited to this. The number of layers may be changed to, e.g., "5" or "6", as a matter of course.

The present invention can be applied to a system constituted by a plurality of devices (e.g., host computer, interface, reader, printer) or to an apparatus comprising a single device (e.g., copy machine, facsimile).

Further, it goes without saying that the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   decoding means for decoding image information represented by hierarchical codes;
   resolution conversion means for converting a resolution of the decoded information which is decoded by said decoding means into a desired resolution; and
   control means for controlling said decoding means and said resolution conversion means such that said decoding means decodes a hierarchical code necessary for reproducing an image having, of resolutions which can be represented by the hierarchical codes, a resolution higher than and closest to the desired resolution, and said resolution conversion means converts the resolution of the image into the desired resolution by using the decoded information which has been decoded by said decoding means.

2. The apparatus according to claim 1, further comprising first storage means for storing the hierarchical code to be decoded by said decoding means.

3. The apparatus according to claim 2, wherein said first storage means is a memory.

4. The apparatus according to claim 2, wherein said first storage means is a hard disk.

5. The apparatus according to claim 1, wherein said decoding means decodes the hierarchical code by a hierarchical coding method.

6. The apparatus according to claim 5, wherein said decoding means performs decoding by progressive build-up according to JBIG scheme.

7. The apparatus according to claim 1, further comprising:
   input means for inputting image data;
   coding means for performing hierarchical coding for the image data input by said input means; and
   second storage means for storing code information of each layer obtained by hierarchical coding by said coding means,
   wherein said control means selects, code information of a layer necessary for representing an image having, of resolutions which can be represented by the hierarchical code information stored in said second memory, a resolution higher than and closest to the desired resolution, and causes said decoding means to decode the code information.

8. The apparatus according to claim 1, wherein the desired resolution is defined by a resolution of an output destination device of image information obtained by said resolution conversion means.

9. The apparatus according to claim 8, wherein said output destination device includes a printer, a CRT, and a facsimile connected through a communication line.

10. The apparatus according to claim 8, further comprising first designation means for designating said output destination device.

11. The apparatus according to claim 7, wherein said input means includes a scanner for reading an image original.

12. The apparatus according to claim 11, further comprising second designation means for designating to read said image original.

13. An image processing method of converting image information represented by hierarchical codes into image data at a desired resolution, comprising the steps of:
   decoding the image information represented by the hierarchical codes to reproduce image data;
   converting a resolution of the image data which has been decoded and reproduced in said decoding step into the desired resolution; and
   controlling said decoding step and said converting step such that a hierarchical code necessary for reproducing an image having, of resolutions which can be represented by the hierarchical codes, a resolution higher than and closest to the desired resolution is decoded in said decoding step, and the resolution of the image data which has been decoded and reproduced in said decoding step is converted into the desired resolution in said converting step.

14. The method according to claim 13, further comprising the steps of:
   inputting the image data;
   performing hierarchical coding for the image data input in said inputting step; and
   storing code information of a layer obtained by hierarchical coding in said performing hierarchical coding step into a storage medium.

15. The method according to claim 13, wherein the decoding step includes the step of decoding the hierarchical code by a hierarchical coding method.

16. The method according to claim 15, wherein the decoding step includes the step of decoding the image information by progressive build-up according to JBIG scheme.

17. A computer program product comprising a computer readable medium having computer program codes, for executing image processing, said product including:
   decoding process procedure codes for decoding image information represented by hierarchical codes to reproduce image data;
   resolution-converting process procedure codes for converting a resolution of the decoded and reproduced image data into a desired resolution; and
   control process procedure codes for controlling execution of said decoding process and resolution-converting process such that a hierarchical code necessary for reproducing an image having, of resolutions which can be represented by the hierarchical codes, a resolution higher than and closest to the desired resolution is decoded by executing said decoding process procedure codes, and the resolution of the decoded and reproduced image data is converted into the desired resolution by executing said resolution-converting process procedure codes.

* * * * *